United States Patent
Tanaka et al.

(10) Patent No.: US 7,175,877 B2
(45) Date of Patent: Feb. 13, 2007

(54) FILM, OPTICAL MEMORY MATERIAL WITH THE FILM, AND METHOD FOR PRODUCING THE FILM

(75) Inventors: Takuo Tanaka, Saitama (JP); Satoshi Kawata, Saitama (JP); Takayuki Okamoto, Saitama (JP)

(73) Assignee: Riken, Saitama (JP)

( * ) Notice: Subject to any disclaimer, the term of this patent is extended or adjusted under 35 U.S.C. 154(b) by 44 days.

(21) Appl. No.: 10/808,517

(22) Filed: Mar. 25, 2004

(65) Prior Publication Data

US 2004/0258955 A1    Dec. 23, 2004

(30) Foreign Application Priority Data

Jun. 20, 2003   (JP) .............................. 2003-175819

(51) Int. Cl.
  *B05B 5/00*   (2006.01)
(52) U.S. Cl. .................. 427/157; 264/21; 427/425; 428/690
(58) Field of Classification Search ................ None
  See application file for complete search history.

(56) References Cited

U.S. PATENT DOCUMENTS

| | | | |
|---|---|---|---|
| 4,139,342 A * | 2/1979 | Sheldrake et al. ............. 8/509 |
| 6,115,344 A * | 9/2000 | Gudesen et al. ............. 369/100 |
| 6,413,655 B2 * | 7/2002 | Otani et al. ................. 428/690 |
| 6,432,610 B1 * | 8/2002 | Rentzepis et al. ..... 430/270.15 |
| 2005/0003133 A1 * | 1/2005 | Akiba et al. ............... 428/64.2 |

OTHER PUBLICATIONS

Dvornikov, et al., "Materials and Systems for Two Photon 3-D ROM Devices", Jun. 1997, IEEE Transactions on Components, Packaging, and Manufacturing Technology, Part A, vol. 20, No. 2, pp. 203-212.*

Tanaka, et al., "Rhodamine-B-doped and Au(III)-doped PMMA film for three-dimensional mulit-layered optaical memory", Oct. 2002, Optics Communications, ol. 212, Issues 1-3, pp. 45-50.*

* cited by examiner

*Primary Examiner*—Bruce H. Hess
(74) *Attorney, Agent, or Firm*—Birch, Stewart, Kolasch & Birch, LLP

(57) ABSTRACT

Disclosed is a film comprising PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, said fluorescent substances being dispersed in the PMMA. The film is useful as an optical memory.

8 Claims, 12 Drawing Sheets

FILM, OPTICAL MEMORY MATERIAL WITH THE FILM, AND METHOD FOR PRODUCING THE FILM

This Nonprovisional application claims priority under 35 U.S.C. § 119(a) on Patent Application No(s). 175819/2003 filed in Japan on Jun. 20, 2003, the entire contents of which are hereby incorporated by reference.

BACKGROUND OF THE INVENTION

1. Field of the Invention

The present invention relates to a film of PMMA with a fluorescent substance dispersed therein, to an optical memory material with the film, and to a three-dimensional memory that comprises the optical memory material. The invention also relates to a method for producing the film that comprises PMMA and a fluorescent substance.

2. Description of the Background

The recording capacity of optical memory is greatly increasing these days. This is because of the increasing necessity for it from the development of advanced information society. At present, CD may have 650 Mbytes and single-face one-layer DVD may have4.7 Gbytes, and these recording capacities could not be expected a few years ago. This tendency will go on further, and it may be considered that ultra-mass storage optical memories of a level of T (tera) bytes to P (peta) bytes will be needed in the near future. The advantages of optical memory are the transportability, the long recording life, the resistance to vibration and the mass-reproduction technology. Therefore, optical memory is superior to magnetic recording. In point of the capacity thereof, optical memory is superior to semiconductor memory (smart media, memory sticks). With further popularization of internets, digital videos/cameras, high-definition TVs and others for general home use, optical memory will be much more needed and expected in future.

The recording density of optical memory depends on the capability thereof for light convergence. The size of converging spot is determined by the property as waves of light, and the size is limited to around the wavelength of light owing to the wave diffraction of light. At present, the capability of optical memory is already approaching the physical limit.

A new technical breakthrough is now desired for solution of the problem, for which various methods are now under study. They are (A) a method of using a source of light having a shorter wavelength; (B) a method of using near-field optics for overcoming the limitation on wavelength; and (C) a method of expanding the recording region from two-dimensional plane to three-dimensional space. However, the method (A) of using a source of light having a shorter wavelength is problematic in that semiconductor laser applicable to such light is difficult to develop. In addition, since optical material having a high transmittance within such wavelength range is rare, the method (A) is not practicable. The method (B) of using near-field optics for overcoming the limitation on wavelength is problematic in that, in near-field recording, the distance between the optical head and the recording medium must be near to a few nanometers and it must be kept as such with high accuracy. In addition to the technical difficulty thereof, another drawback of the method is that it could not well utilize the far-running property of light. As opposed to these, the method (C) of recording in a three-dimensional space could be an idea conversion from conventional methods, and it may be a method with hidden potential.

The method of recording information data in a three-dimensional space differs from recording them on one layer alone of a recording medium like in CD, and it comprises positively using the inside of a recording medium for three-dimensionally recording information data in multiple layers of the medium, as in FIG. 17, to thereby increase the space where information data are to be recorded and to increase the recording capacity of the medium. Three-dimensional recording requires a recording medium that enables multi-layer recording, and an optical system that comprises a light source and an objective lens for recording and writing information data in the three-dimensional space of the recording medium and for reproducing the thus-written data. The recording medium and the recording-reproducing optical system must have non-linear responsibility. Only when all these problems with it have been solved, the method will be practicable.

At present, optical engineering technology has made remarkable advances, and it is now possible to solve the above-mentioned problems. Regarding the recording mode, laser light is converged on a recording medium to cause non-linear chemical change of the substance of the medium at the spot position thereof at which the light intensity has increased, whereby the problem with the recording mode may be solved. On the other hand, the problem with the reproduction mode may be solved by employing a laser scanning confocal microscope which has a resolving power also in the depth direction thereof and is characterized in that its in-plane resolving power is two times that of an ordinary incoherent bright-field microscope. For recording materials of non-linear responsibility, heretofore proposed are photo-polymers, photo-refractive crystals and photo chromic materials that accept information recording thereon as refractive index distribution. Also proposed are urethane-urea copolymers for them. Various methods of using these recording materials and recording-reproducing optical systems and also three-dimensional optical memories and are now under active study.

For reflection optical memories, known are CD and DVD. For these, employed is a method of forming grooves in accordance with 0/1 information data on the recording surface of the medium, convergent light is applied to the part, and the intensity of the reflected light is read with a detector. In CD-R and DVD-R, a blue-green organic dye is applied on the recording surface of the medium in place of forming the information grooves as in CD and DVD, convergent light is applied to it to burn the dye, and information data are recorded as the burnt pattern in place of the grooves in CD and DVD. On the other hand, in fluorescence recording optical memories, a fluorescent dye-containing recording material is used as the recording medium. For data recording thereon, convergent light is irradiated to the sample to cause chemical change of the fluorescent dye in the irradiated part. Through the chemical change, the fluorescence intensity of the part in excited light irradiation thereto increases or decreases, and based on the fluorescence contrast difference between the irradiated part and the non-irradiated part, 0/1 information data are recorded on the medium.

A fluorescent dot pattern may be recorded in a three-dimensional space by combining the above-mentioned techniques, and this method is for fluorescence recording three-dimensional multi-layer optical memory. The light irradiated from laser is converged inside the recording material that contains a fluorescent sample, through an objective lens, and this is recorded in three-dimensional multiple layers as fluorescent dot data. For reproducing the recorded information data, used is an optical microscope system that enables three-dimensional structure observation. An outline of an episcopic confocal fluorescence microscope is described in point of the mechanism and the optical system thereof, with reference to FIG. 13. The microscope is characterized in that a pinhole is disposed before the detector thereof, and it is known that the microscope has a high three-dimensional resolving power. When excited light is converged on the previously-recorded fluorescent dot data, then it gives fluorescence. The fluorescence passes through an objective lens and is reflected by a beam splitter. The reflected fluorescence passes through the pinhole disposed before the detector, and is then detected by the detector. In that manner, the light from the focal position of the objective lens can pass through the pinhole, but the light having scattered not in the focal position and the fluorescence emitted not therein do not pass through the pinhole but are cut. Accordingly, the optical detector can detect only the fluorescence from the focal position and therefore ensures reading operation with three-dimensional resolution. At present, fluorescence recording optical memories based on the light-emitting and extinguishing property of fluorescent substances have been already reported, and the probability of their application to three-dimensional recording modes is much expected.

A preprint for the 62nd Academic Lecture Meeting of the Applied Physics Society of Japan, September 2001, page 886, and a preprint for the 49th Joint Lecture Meeting of the Applied Physics Society of Japan, March 2002, page 1268 disclose a combination of polymethyl methacrylate (hereinafter referred to as PMMA) and rhodamine B for a material for such optical memories. This utilizes the characteristic of rhodamine B mentioned below.

Specifically, when rhodamine B exists as a form of:

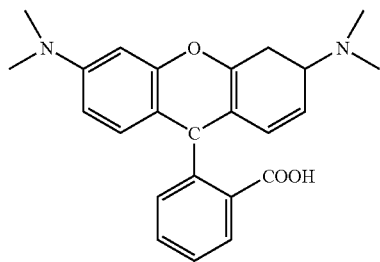

then it exhibits pink, and emits fluorescence through exposure to excited light. On the other hand, when it exists as a form of:

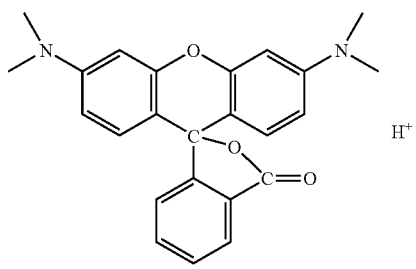

then it is colorless and does not emit fluorescence. In this connection, J. Muto, F. Higuchi, *Phys. Lett.*, 96A, No. 2, 101 (1983) says that the color presentation and the light emission of the compound are both owing to ring cleavage/ring closing of the lactone ring of the compound.

Some study cases of utilizing the above-mentioned mechanism for recording media of three-dimensional optical memories have been reported. In the preprint for the 62nd Academic Lecture Meeting of the Applied Physics Society of Japan, September 2001, page 886, announced is a study report saying that a monomer methyl methacrylate (hereinafter referred to as MMA), a polymerization initiator MMA polymer, tetrachloroauric acid and rhodamine B are formulated, and the resulting solution is solidified on a cover glass to fabricate a recording medium. In this method, when 3-valent gold ions exist near rhodamine B molecules, they absorb the energy in light excitation and retard fluorescence emission. When the recording medium is irradiated with UV light, then the 3-valent gold ions in the irradiated area are reduced to give gold particles. The gold particles could not absorb the energy of excited light and therefore the irradiated area may emit fluorescence. The ON-OFF switching of UV light makes it possible to record a fluorescence pattern on the recording medium.

The preprint for the 49th Joint Lecture Meeting of the Applied Physics Society of Japan, March2002, page 1268 discloses PMMA doped with rhodamine B in the absence of chloroauric acid. Specifically, a polymer formed through polymerization of a solution of a monomer MMA, rhodamine B and a polymerization initiator is known. When the polymer is irradiated with UV light and further with excited green light, then the irradiated part alone thereof emits fluorescence. The ON-OFF switching of UV light makes it possible to record a fluorescence pattern on the recording medium.

This is described concretely with reference to FIG. 18. a) Rhodamine B dissolved in a solvent is generally red, and it has an absorption peak at a wavelength of 542.8 nm and emits fluorescence. b) When rhodamine B is doped into PMMA, then it loses its color and fades to be colorless transparent. In this condition, even when it is irradiated with excited light, it does not emit fluorescence. c) When the rhodamine B-doped PMMA is irradiated with UV light, then the rhodamine B is re-activated in the irradiated area and again emits pink. d) When the UV-irradiated part is further irradiated with excited light, then it emits fluorescence. Rhodamine B has an absorption peak at a wavelength of 542.8 nm and has a fluorescence peak at a wavelength of 565 nm.

Through our studies, however, we, the present inventors have found that it is extremely difficult to use the above-mentioned material that contains PMMA and rhodamine B for a memory material. Specifically, the above-mentioned composition that contains PMMA and rhodamine B could not be formed into films in conventional techniques. For example, even when the composition is formed into film in a mode of spin coating, all its components immediately evaporate away. This is because the viscosity of the starting MMA for PMMA is originally extremely low and it is a highly-volatile liquid. Accordingly, even when the method of polymerizing MMA to give PMMA is utilized, only a composition containing PMMA which is solid in some degree and rhodamine B could be obtained.

Through our further studies, we have found that, when MMA is polymerized according to conventional methods, then the degree of polymerization of the polymer PMMA formed is unclear and is extremely uneven, and it is difficult to readily control the degree of polymerization of the polymer. Therefore, we have found that, even when MMA is polymerized, it is still impossible to produce a polymer film having a uniform surface and having a uniform thickness.

We actually investigated a method of forming a thin mass relatively near to a film, according to the above-mentioned method. Concretely, a space having a width of a few millimeters or so was formed of glass slides, and the above-mentioned polymerization was tried in the space. In this case, however, bubbles were formed in the resin and the resin became cloudy. In addition, rhodamine B was denatured owing to the heat generated by MMA polymerization, and the resulting polymer could not undergo the mechanism of fluorescence emission/extinction in many cases. Accordingly, it was impossible to obtain films from the composition that contains PMMA and rhodamine B according to conventional methods. In particular, the composition that may fail to undergo the mechanism of fluorescence emission/extinction is a serious defect in optical memory materials.

SUMMARY OF THE INVENTION

Considering the result of our studies of using PMMA mentioned above, we, the present inventors tried producing PMMA doped with fluorescent dye, not using the method of polymerizing the monomer MMA. As a result, we have found that, when PMMA is dissolved in a solvent, then it may be doped with rhodamine B, and have completed the present invention. Concretely, the invention introduces the following means for solving the above-mentioned problems.

A film comprising PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, dispersed in the PMMA; the film wherein the fluorescent substance is a compound of the following formulae (1)(a) and/or (b):

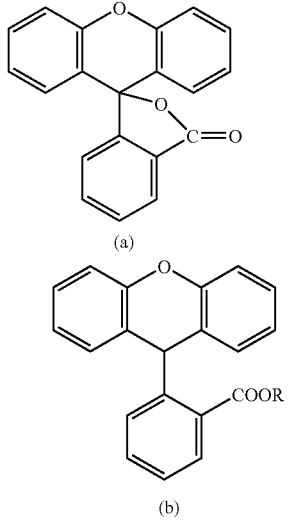

Formula (1)

(a)

(b)

wherein R represents a hydrogen atom or a substituent; the film having a thickness of at most 10 μm; the film having a thickness of at most 1 μm; the film wherein the fluorescent substance is rhodamine B, fluoresceine or eosine Y; the film wherein the fluorescent substance is rhodamine B; the film wherein the PMMA has a weight-average molecular weight of from 50,000 to 200,000;

A multidimensional optical memory with a film that comprises PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, dispersed in the PMMA; the two-dimensional optical memory; the three-dimensional optical memory; the multi-layered optical memory;

A method for producing a fluorescent material containing PMMA and a fluorescent substance, which comprises a step of dissolving PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, in a solvent, and a step of removing the solvent from the solution of the PMMA and the fluorescent substance dissolved therein; a method for producing a film containing PMMA and a fluorescent substance, which comprises a step of dissolving PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, in a solvent, and a step of removing the solvent from the solution of the PMMA and the fluorescent substance dissolved therein; the film-producing method wherein the solvent is a non-polar solvent; the film-producing method wherein the solvent is a cellosolve acetate; the film-producing method wherein the amount of the PMMA is from 5 to 35% by weight of the solvent; the film-producing method which includes a step of forming the film in a mode of spin coating; the film-producing method which includes a step of forming the film having a thickness of at most 10 μm in a mode of spin coating; the film-producing method which includes a step of forming the film having a thickness of from 1 to 10 μm in a mode of spin coating; the film-producing method which includes a step of forming the film having a thickness of at most 1 μm in a mode of spin coating.

BEST MODE FOR CARRYING OUT THE INVENTION

Figure 1:
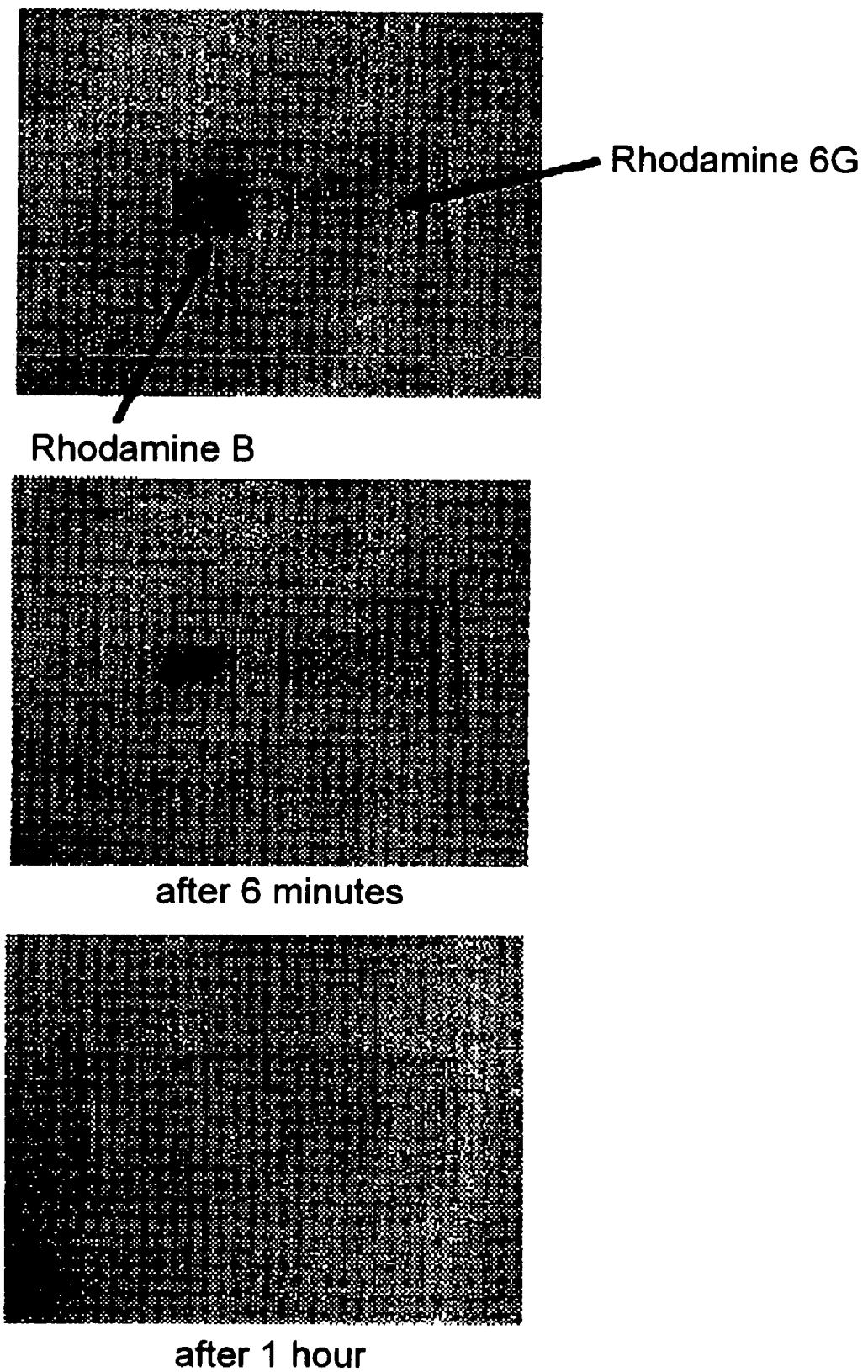
FIG. 1 is photographs showing time-dependent changes of PMMA doped with rhodamine B or rhodamine 6G.

The film of the invention is described herein under. PMMA for use for the film of the invention (this may be hereinafter referred to as "PMMA for the film of the invention") means polymethyl methacrylate. This is a polymer of methyl methacrylate. The film as referred to here in means, for example, a thin filmy substance. The thin filmy substance is, for example, one that covers a part or all of the surface of a substance, or one that may be used for enveloping or wrapping a substance therein.

The condition of fluorescent substance dispersed in PMMA as referred to herein means, for example, that a fluorescent substance exists in PMMA while almost uniformly dispersed therein. Therefore, the fluorescent substance may not always be uniformly dispersed in PMMA. The doped condition as referred to herein means that PMMA contains a fluorescent substance dispersed therein.

PMMA for the film of the invention preferably has a weight-average molecular weight (hereinafter this may be abbreviated to M.W.) of from 50,000 to 200,000, more preferably from 90,000 to 150,000. Using PMMA that has such a relatively uniform weight for the film of the invention facilitates the production of films having a uniform thickness of at most 10 μm, especially at most 1 μm.

Not overstepping the sprit of the invention, PMMA for the film of the invention is not specifically defined. For example, commercially-available products maybe used for it. Concretely, herein usable are PMMA having M.W. of 100,000 (e.g., Wako Pure Chemical's product number 138-02735), PMMA having M.W. of 120,000 (e.g., Aldrich's product number 18223-0), PMMA having M.W. of 350,000 (e.g., Aldrich's product number 44574-6), PMMA having M.W. of 700,000 (e.g., Nacalai Tesque's product number22726-85), PMMA having M.W. of 135,000 (e.g., Tokyo Chemical's product number M0088, n-13,500), PMMA having M.W. of 140,000 (e.g., Tokyo Chemical's product number M0088, n-14,000), and PMMA having a melt flow rate (g/10 min) of 2.0, 6.0, 14.0 (e.g., Mitsubishi Rayon's products VH, MD, MF, respectively).

The fluorescent substance as referred to herein is a substance of which a dilute solution emits fluorescence through irradiation with excited light thereto. Concretely, at least a part of the substance undergoes cleavage of the lactone ring to have a structure of —COOR, where R represents a hydrogen atom or a substituent, in its dilute solution, and when doped into PMMA, at least a part of the substance has a structure of lactone ring. More concretely, the fluorescent substance as referred to herein is a fluorescent substance having a xanthene skeleton and a lactone ring and/or a fluorescent substance having a xanthene skeleton and a group —COOR, where R represents a hydrogen atom or a substituent, capable of forming an intramolecular lactone ring. The xanthene skeleton is, for example, represented by the following:

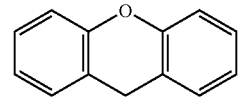

The structure having a xanthene skeleton as referred to herein means that at least one hydrogen of the substance is substituted with such a xanthene skeleton.

As so mentioned hereinabove, the fluorescent substance for use in the invention forms a lactone ring in its initial condition doped in PMMA. When reactivated, the lactone ring in it is cleaved. Accordingly, when it is irradiated with excited light after that, then it emits fluorescence. In —COOR where R represents a hydrogen atom or a substituent, the substituent is not specifically defined so far as it does not interfere with the formation of lactone ring. For example, the substituent includes sodium atom and potassium atom. The mechanism of lactone ring cleavage/closing enables ON/OFF mechanism of light emission.

More concretely, the fluorescent substance for use in the invention has a structure of the following formulae (1) (a) and/or (b):

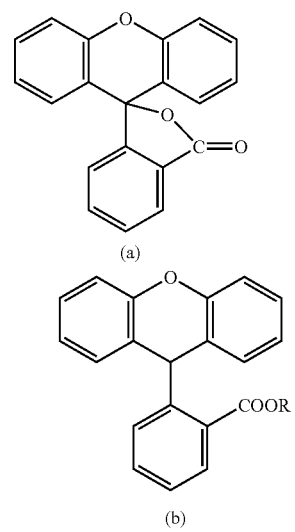

Formula (1)

(a)

(b)

wherein R represents a hydrogen atom or a substituent.

While the substance is doped in PMMA, its lactone ring exists as the form of formula (1)(a). When reactivated, the lactone ring is cleaved (as in formula (1) (b)); and when irradiated with excited light after that, the substance emits fluorescence. The substituent as referred to herein has the same meaning as the above-mentioned substituent R.

Preferred examples of the fluorescent substance for use in the film of the invention are rhodamine B, fluoresceine, eosine, eosine Y, erythrosine. One or more such fluorescent substances may be used herein. These fluorescent dyes all exhibit red to violet in their dilute solutions in ethanol or water. When irradiated with excited light, the irradiated part emits fluorescence. Even when doped in PMMA, most of these fluorescent dyes form the lactone ring therein. In that condition, therefore, the dyes lose fluorescence and color. When the dyes under the condition are irradiated with UV light or visible light in a short wavelength range, then they again exhibit their color. When further irradiated with excited light, then they again emit fluorescence. Specifically, when the fluorescent dyes are used in optical memory materials, the mechanism of fluorescence emission/disappearance that depends on the light irradiation is indispensable to them. Accordingly, one indispensable requirement for the fluorescent substance for use in the film of the invention is that it has a structure of enabling lactone ring cleavage/closing. The fluorescence emission and the color emission both occur through the same mechanism. Accordingly, while the dye emits color, it emits fluorescence through irradiation of excited light thereto.

The fluorescent substance for use in the film of the invention is characterized in that it forms a lactone ring. Therefore, those not forming a lactone ring such as rhodamine 6G are not within the scope of the fluorescent substance for use in the film of the invention. Rhodamine 6G is represented by the following:

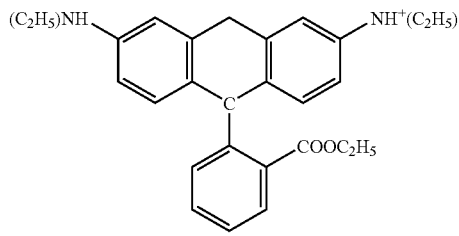

The concentration of the fluorescence substance to be in the film of the invention is not specifically defined. Preferably, it may be from $1\times10^{-5}$ to $1\times10^{-2}$% by weight of PMMA, more preferably from 0.005 to 0.1% by weight of PMMA. The concentration of the fluorescent substance that is lower than 0.01% by weight of PMMA ensures film transparency and gives optical memory materials of high quality. In particular, when rhodamine B is used, its concentration is preferably from 0.01 to 0.1% by weight of PMMA.

One preferred example comprises PMMA having M.W. of from 90,000 to 150,000 and a fluorescent substance having a concentration of from $1\times10^{-3}$ to $1\times10^{-1}$% by weight of PMMA.

The reactivation as referred to herein means that the fluorescent substance can emit fluorescence through irradiation with excited light. For example, when irradiated with UV light or visible light, the fluorescent substance is to have the condition. Preferably, the visible light for irradiation is one falling within a short wavelength range. Concrete data of the wavelength of UV light and visible light usable herein are at most 500 nm, preferably from 300 to 500 nm. In particular, visible light having a wavelength range of from 400 nm to 450 nm is advantageous for practical use of optical memory materials under the current situation where the development of semiconductor laser falling within a UV range is difficult.

The excited light as referred to herein is not specifically defined so far as it may perform the fluorescence emission mechanism mentioned above. For rhodamine B, for example, the excited light may have a wavelength of from 530 to 550 nm.

The film of the invention is characterized in that its thickness is at most 10 µm, especially from 1 to 2 µm. Compositions containing PMMA and fluorescent substance have heretofore been known in the art. Since the film of the invention has a uniform thickness, it maybe used in various applications. For example, by utilizing the fluorescence emission intensity distribution thereof, the film may be used in optical memory materials. In addition, the optical memory material maybe used for two-dimensional memories and three-dimensional memories, especially for three-dimensional multi-layered memories.

The method for producing the fluorescent material or the film of the invention is characterized in that it includes a step of dissolving PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring, in a solvent, and a step of removing the solvent from the solution of the PMMA and the fluorescent substance dissolved therein.

For producing a film such as a filmy substance, for example, a solution of PMMA and a fluorescent substance may be dropped onto a glass plate or the like, and it may be formed into a filmy substance in a mode of spin coating or the like. Concretely, for producing a film having a thickness of from 1 to 10 µm or so, a spin coater is preferably used. For producing a film having a thickness of from 10 to 100 µm or so, for example, a mode of dip coating may also be employed. For measuring the thickness of films, employable is any conventional technique of using a probe profiler (by Ulvac) or the like.

The fluorescent material as referred to herein is a material of PMMA doped with a fluorescent substance, and it is meant to include not only filmy materials to be mentioned herein under but also all materials of any other forms such as massive materials, etc. In conventional methods of polymerizing MMA, there occurs a problem in that the massive materials formed contain bubbles, as so mentioned hereinabove. The production method of the invention evades this problem.

PMMA that is used in the method of producing the film of the invention (this may be herein under referred to as "the production method of the invention") may be the same as PMMA for use in the film of the invention. The invention is characterized in that not MMA but already produced PMMA is used. Specifically, a method of polymerizing MMA and doping a fluorescent dye into the reaction system has heretofore been disclosed in the art. However, the method has the problem mentioned above. The production method of the invention has solved the problem, and is characterized in that it has made it possible produce films having a thickness of at most 10 µm, especially those having a thickness of from 1 to 10 µm. Further, another characteristic effect of the method is that the films formed are uniform. Such uniform films having a specific thickness could not be produced in any conventional methods.

In the production method of the invention, the concentration of PMMA is preferably from 5 to 35% by weight of the solvent. When its concentration falls within the defined range, PMMA may more readily give uniform films having a thickness of at most 10 µm, especially having a thickness of from 1 to 10 µm.

The fluorescent dye for use in the production method of the invention may be the same as those for use in the film of the invention mentioned hereinabove.

The solvent for use in the production method of the invention is a liquid for dispersing a fluorescent substance in PMMA. Specifically, the solvent may be any one capable of dissolving both PMMA and a fluorescent substance while they exist together and capable of being removed from the resulting solution. Accordingly, it is not always necessary that the solvent for use in the production method of the invention can dissolve PMMA or a fluorescent substance alone. For example, the solvent is a non-polar solvent. Concretely, it includes ether and acetone. More concretely, its examples are cellosolve acetates such as ethyl cellosolve acetate (1-acetoxy-2-ethoxyethane), methyl cellosolve acetate (1-acetoxy-2-methoxyethane), butyl cellosolve acetate (1-acetoxy-2-butoxyethane), and butyl cellosolve. Further, the solvent for use in the production method of the invention is poorly volatile. In this respect, cellosolve acetates are good since they are poorly volatile and the liquid containing them may dry gradually.

For mixing and dispersing PMMA and a fluorescent substance, employable is any method of, for example, spontaneous diffusion, or manual or mechanical stirring. The method of removing the solvent from the mixture of PMMA and a fluorescent substance is not specifically defined. For it, any conventional method heretofore generally employed in the art may be used. For example, the solvent may be removed through evaporation or vaporization, or through separation with an organic solvent or the like, or through mechanical separation. For mechanical separation, for example, employable is a vacuum drying method.

The present invention will be further specifically explained with reference to the following examples of the present invention. The materials, amounts, ratios, types and procedures of treatments and so forth shown in the following examples can be suitably changed unless such changes depart from the spirit of the present invention. Accordingly, the scope of the present invention should not be construed as limited to the following specific examples.

EXAMPLE 1

Various fluorescent substances were investigated for their effect. Concretely, PMMA (having M.W. of 100,000, by Wako Pure Chemical) was dissolved in ethyl cellosolve acetate (by Wako Pure Chemical), in a ratio of 20% by weight to the cellosolve acetate, and various fluorescent dyes as in Table 1 below were added to it in a ratio of 0.003% by weight to PMMA, and mixed. 10 µl of each sample was dropped onto a cover glass of a microscope. After 6 minutes and after 1 hour, the samples were observed. The results are shown in Table 1 and FIG. 1.

TABLE 1

|  | (1) | (2) |
|---|---|---|
| Rhodamine B (by Junsei Kagaku) | ○ | X |
| Fluoresceine (by Wako Pure Chemical) | ○ | X |
| Eosine Y (by Wako Pure Chemical) | ○ | X |
| Rhodamine G6 (by Wako Pure Chemical) | ○ | ○ |

In Table 1, ○ means that the dye exhibited its color, and x means that the dye disappeared. As in Table 1, all the dyes except rhodamine 6G disappeared. Accordingly, it is considered that the dyes except rhodamine 6G would form a lactone ring in cellosolve acetate. FIG. 1 are photographic pictures of rhodamine B and rhodamine 6G, <1> in the initial condition (immediately after the sample was dropped onto the cover glass), <2> after 6 minutes, and <3> after 1 hour.

EXAMPLE 2

This is to confirm fluorescence enhancement through UV irradiation. Concretely, any of 6 different types of PMMA having a different molecular weight as in Table 2 was added to ethyl cellosolve acetate in a ratio of 10, 20 or 30% by weight to ethyl cellosolve acetate, and mixed. Further, rhodamine B was added to it in a ratio of $3.3 \times 10^{-3}$, $3.3 \times 10^{-2}$ or $3.3 \times 10^{1}$% by weight to PMMA, and mixed. Each sample was well mixed, and 10 µl thereof was dropped onto a cover glass of a microscope, and put into a laboratory dish and left as such for a half day whereupon ethyl cellosolve acetate evaporated away spontaneously.

TABLE 2

| Sample No. | mean molecular weight (M.W.) or melt flow rate (g/10 min) | Manufacturer |
|---|---|---|
| <1> | M.W. = 100,000 | Wako Pure Chemical |
| <2> | M.W. = 120,000 | Aldrich |
| <3> | M.W. = 350,000 | Aldrich |
| <4> | melt flow rate = 2.0 (VH) | Mitsubishi Rayon |
| <5> | melt flow rate = 6.0 (MD) | Mitsubishi Rayon |
| <6> | melt flow rate = 14.0 (MF) | Mitsubishi Rayon |

Figure 2:
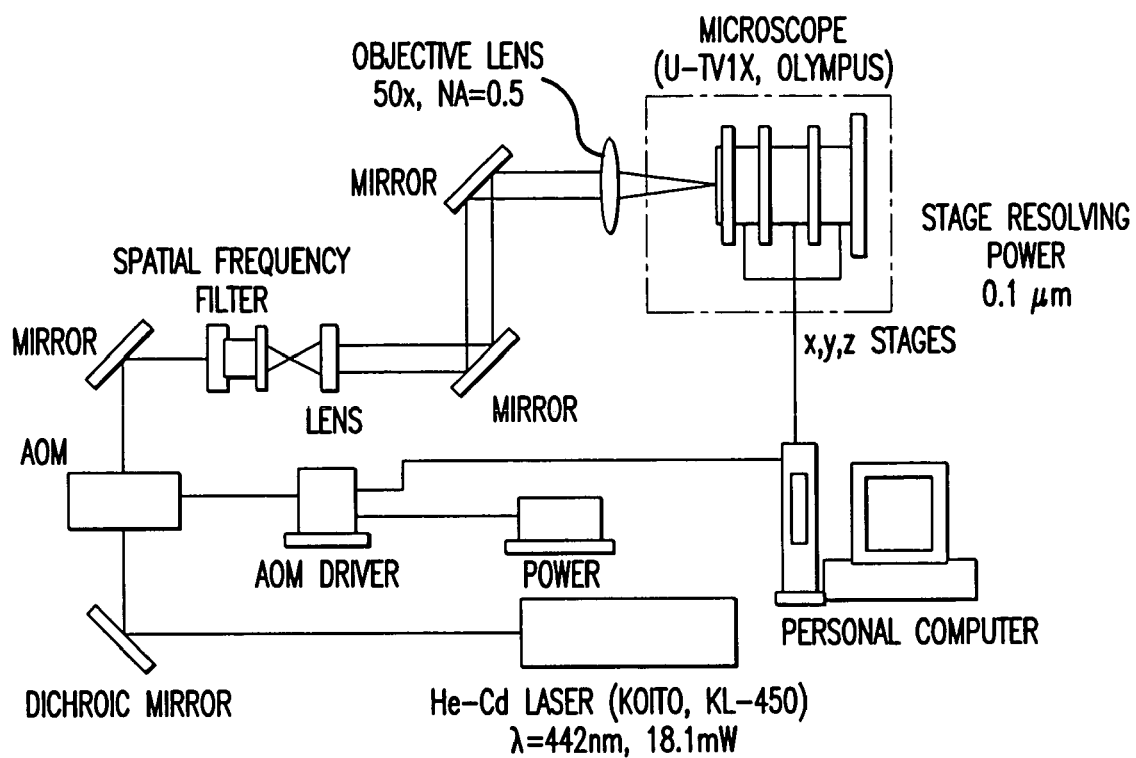
FIG. 2 is an overall view of an optical system for two-dimensional dot patterning.

Using an optical system as in FIG. 2, each sample was irradiated with excited light from YAG laser ($\lambda$=532 nm, 3.5 mW, Uniphase). The fluorescence from each sample was led to a multi-channel detector (Model PMA-11, by Hamamatsu Photonics) via a fiber bundle. At the light-input end of the fiber, the fluorescence was converged via a lens (f=150 mm), and the excited light component was removed from it through a notch filter. The light-receiving fiber was covered with aluminium foil to remove stray light. The fluorescence spectrum of each sample was analyzed. In addition, each sample was irradiated with UV light, and its fluorescence spectrum was also analyzed.

Figure 3:
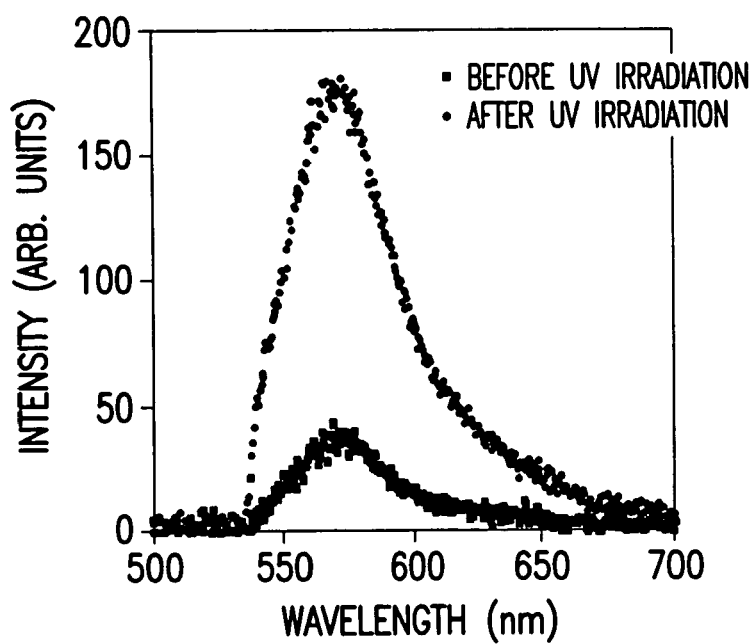
FIG. 3 shows fluorescence spectra before and after UV irradiation.

FIG. 3 shows fluorescence spectra before and after UV irradiation. In this, PMMA <1> in Table 2 was used. The concentration of rhodamine B is 0.033% by weight of PMMA. It is understood that the fluorescence intensity increased by 4.2 times at a wavelength of 570 nm, through UV irradiation to the sample.

Figure 4:
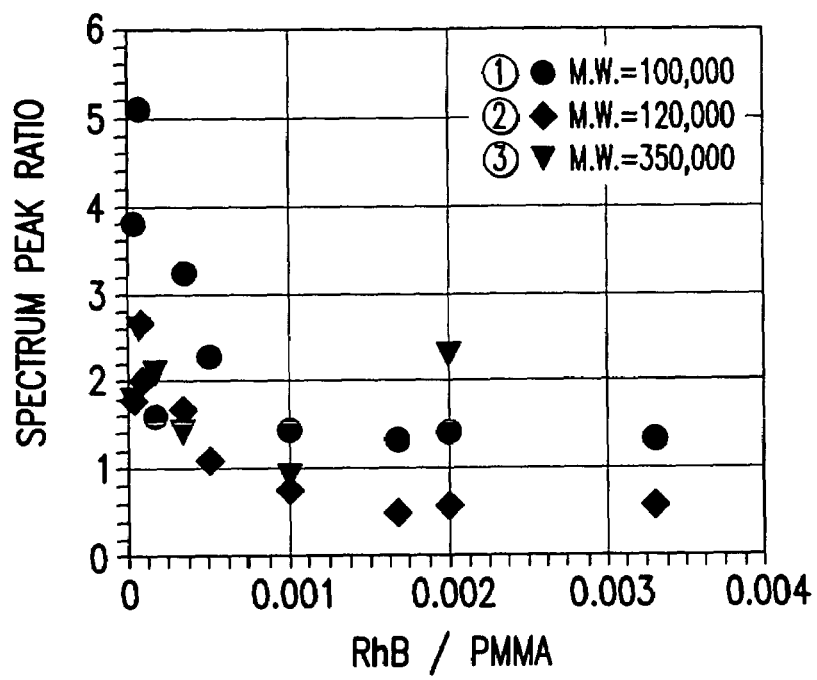
FIG. 4 shows the fluorescence spectrum peak ratio of samples <1> to <3> in Table 2, before and after UV irradiation.
Figure 5:
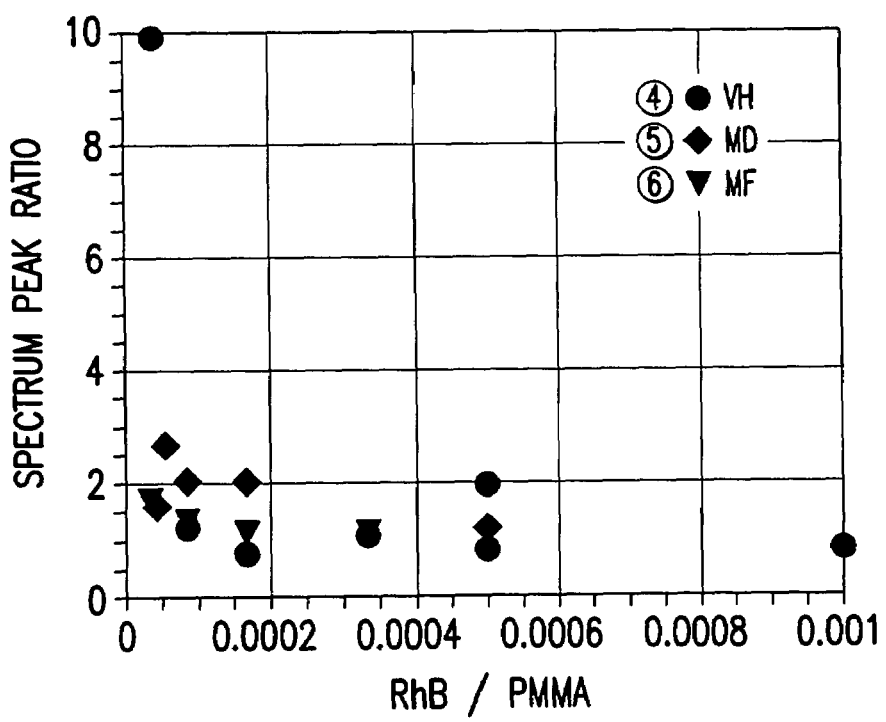
FIG. 5 shows the fluorescence spectrum peak ratio of samples <4> to <6> in Table 2, before and after UV irradiation.

FIG. 4 and FIG. 5 show the fluorescence peak ratio that indicates the fluorescence enhancement ratio before and after UV irradiation, relative to the concentration ratio of rhodamine B to PMMA. In FIG. 4, PMMA is <1>, <2> and <3> in Table 2, and its concentration is 20% by weight of ethyl cellosolve acetate. RhB/PMMA indicates % by weight of RhB to PMMA (the same shall apply herein under). On the other hand, in FIG. 5, PMMA is <4>, <5> and <6> in Table 2, and its concentration is 20% by weight of ethyl cellosolve acetate.

As in FIG. 4, <1> in Table 2 having M.W. of 100,000 gave the highest spectrum peak ratio. When the concentration of rhodamine B fell between 0.005 and 0.1% by weight of PMMA, the spectrum peak ratio was the best. In FIG. 5, <6> in Table 2 having a melt flow rate of 2.0 g/10 min gave the highest spectrum peak ratio. In this case, when the concentration of rhodamine B fell between 0.003 and 0.01% by weight of PMMA, the spectrum peak ratio was the best.

Regarding the concentration of PMMA relative to ethyl cellosolve acetate, changing the PMMA concentration to 10, 20 or 30% by weight caused no difference in the fluorescence enhancement ratio.

Table 3 shows especially preferred data of the above-mentioned test result. In Table 3, the PMMA content is in terms of the ratio (% by weight) to ethyl cellosolve acetate; and the rhodamine B content is in terms of the ratio (% by weight) to PMMA. For the fluorescence enhancement ratio, employed was the sample irradiated with YAG laser light ($\lambda$=532 nm, 3.5 mW) before and after exposure to 100-W mercury lamp.

TABLE 3

| | Sample No. | |
|---|---|---|
| | (1) | (2) |
| PMMA | M.W. = 100,000 | VH |
| | (<1> in Table 1) | (<6> in Table 1) |
| PMMA Content (wt. %) | 20 | 20 |
| Rhodamine B Content (wt. %) | 0.0083 | 0.0033 |
| Fluorescence Enhancement Ratio | 5.13 | 9.9 |

EXAMPLE 3

Figure 6:
FIG. 6 shows the films produced in the Example.
Figure 6:
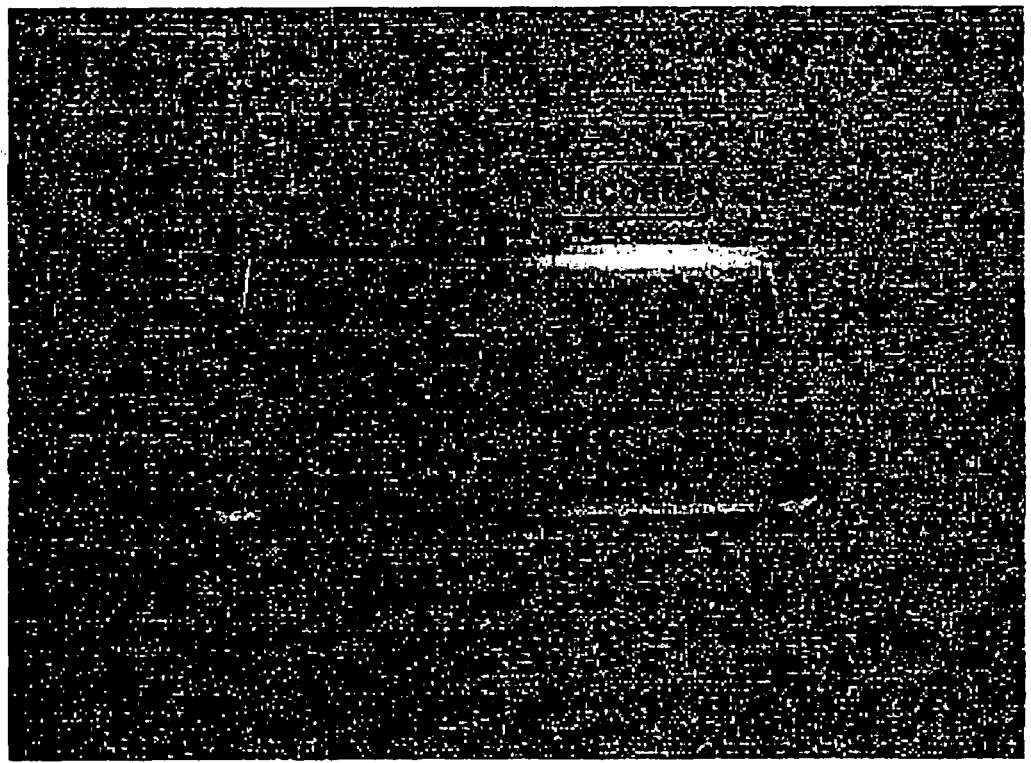
Figure 7:
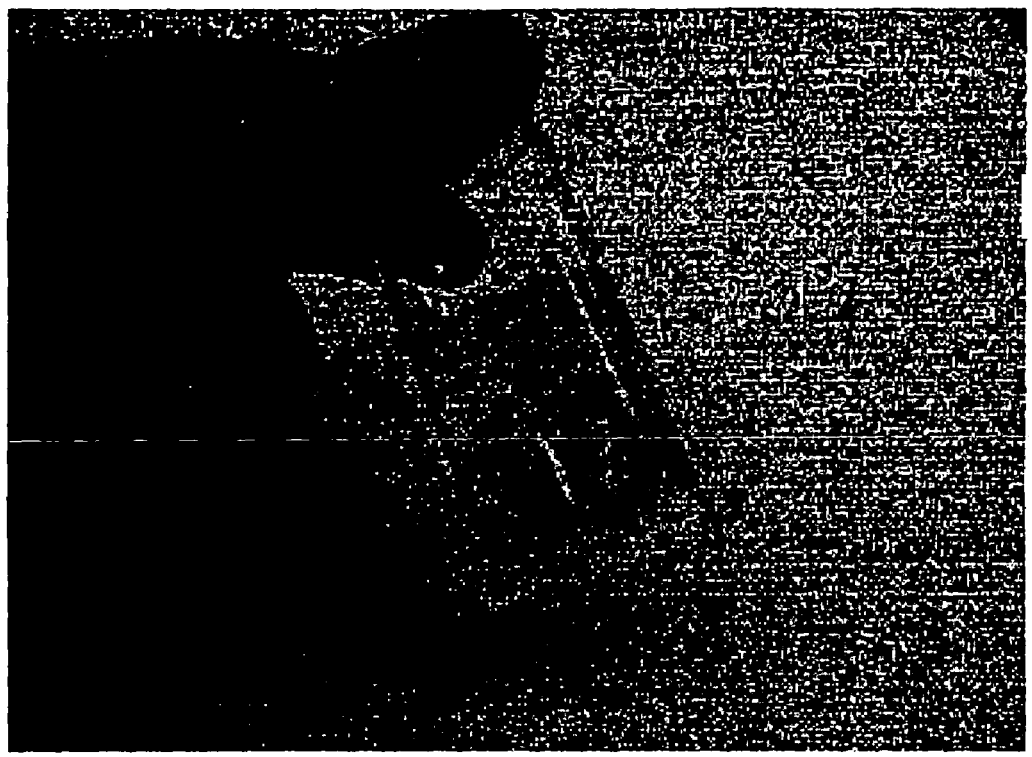
FIG. 7 shows a photographic picture of a conventional composition produced through polymerization of MMA.

Using a spin coater (Mikasa's Model IH-D3), the sample <1> in Table 2 was formed into a film on a glass plate, and this was photographed. The photographic pictures are in FIG. 6. As in FIG. 6(a), an extremely thin film having a thickness of not larger than 1 μm was formed, but it was difficult to see with the naked eye. To further clarify the film formation, a part of the glass plate was masked before spin coating, and the film was formed in the same manner as above. The result is in FIG. 6(b). In FIG. 6(b), reflected light from a fluorescence lamp was introduced while the picture was taken, and this is to more clearly show the presence of the film formed. In FIG. 6(b), pale pink is seen, and this is the dye rhodamine B. On the other hand, FIG. 7 shows PMMA prepared through polymerization of MMA and doped with rhodamine B. As in this, the polymerization of MMA must be effected in a closed vessel, and only a massive solid was formed as the polymer. From this, it is obvious that, even when PMMA prepared according to conventional polymerization is doped with rhodamine, it could not form a film.

EXAMPLE 4

Using the sample (1) in Table 3, a two-dimensional fluorescent dot pattern was formed on the basis of the property of the sample for fluorescence enhancement through irradiation with visible light. This example is the same as Example 2 except for the following points.

1. He—Cd laser (KL450 by Koito, 18.2 mW) having a wavelength of 442 nm was used for visible light.
2. The laser was much converged through an objective lens for microscope, and the dot pattern was formed.
3. The sample was formed on a cover glass, and this was scanned with a PC-controlled X-Y-Z stage (LV-641-AE1 by Chuo Seiki, resolving power 0.1 μm).
4. For the switch for the laser necessary for patterning, used was an acoustic optical modulator (AOM, 232A-1 by Isomet)

Figure 8:
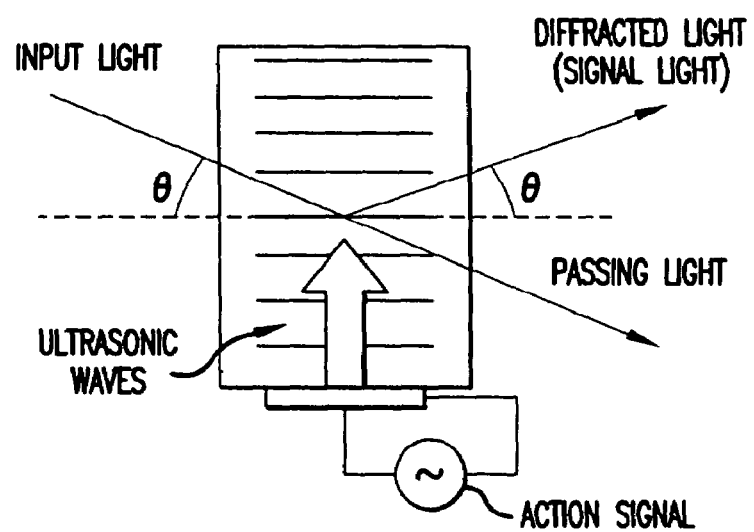
FIG. 8 shows a schematic view of diffraction occurring in AOM.

AOM used herein is a device in which the compression wave of the refractive index that results from ultrasonic wave propagation through optical glass or optical crystals is used as a diffraction grating, as in FIG. 8. The primary diffracted light in AOM was used as writing light. The light from the He—Cd laser was reflected on a mirror, led into the PC-controlled AOM, and then passed through a spatial frequency filter. The beam diameter was controlled to be uniform, and the beam diameter of the irradiated light was broadened. The broadened light was led into the objective lens of an episcopic optical microscope (U-TV1X by Olympus Optical Industry), and converted inside the sample put on the PC-controlled X-Y-Z stage to thereby form dots. Thus formed, the fluorescent dot pattern was observed with the same optical system as that used for the dot formation, and a halogen lamp was used for the excited light for the observation.

Figure 9:
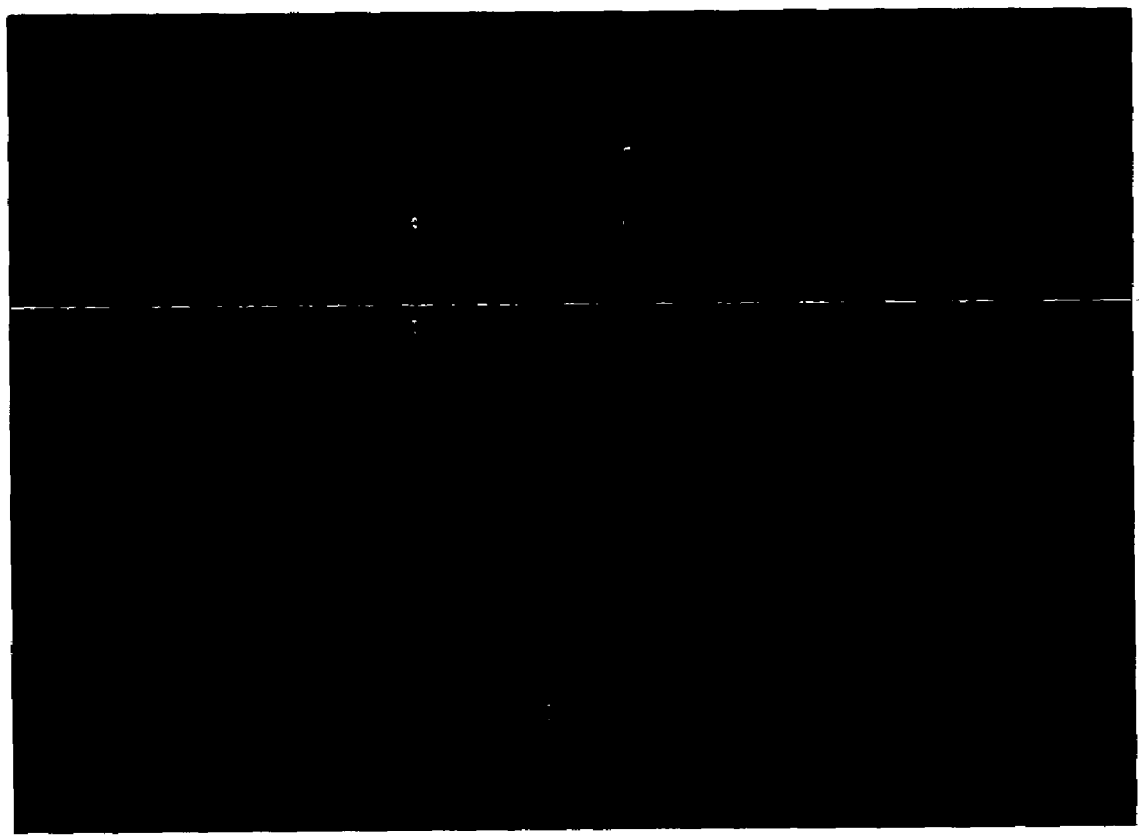
FIG. 9 shows a fluorescent dot pattern with 442-nm light.
Figure 10:
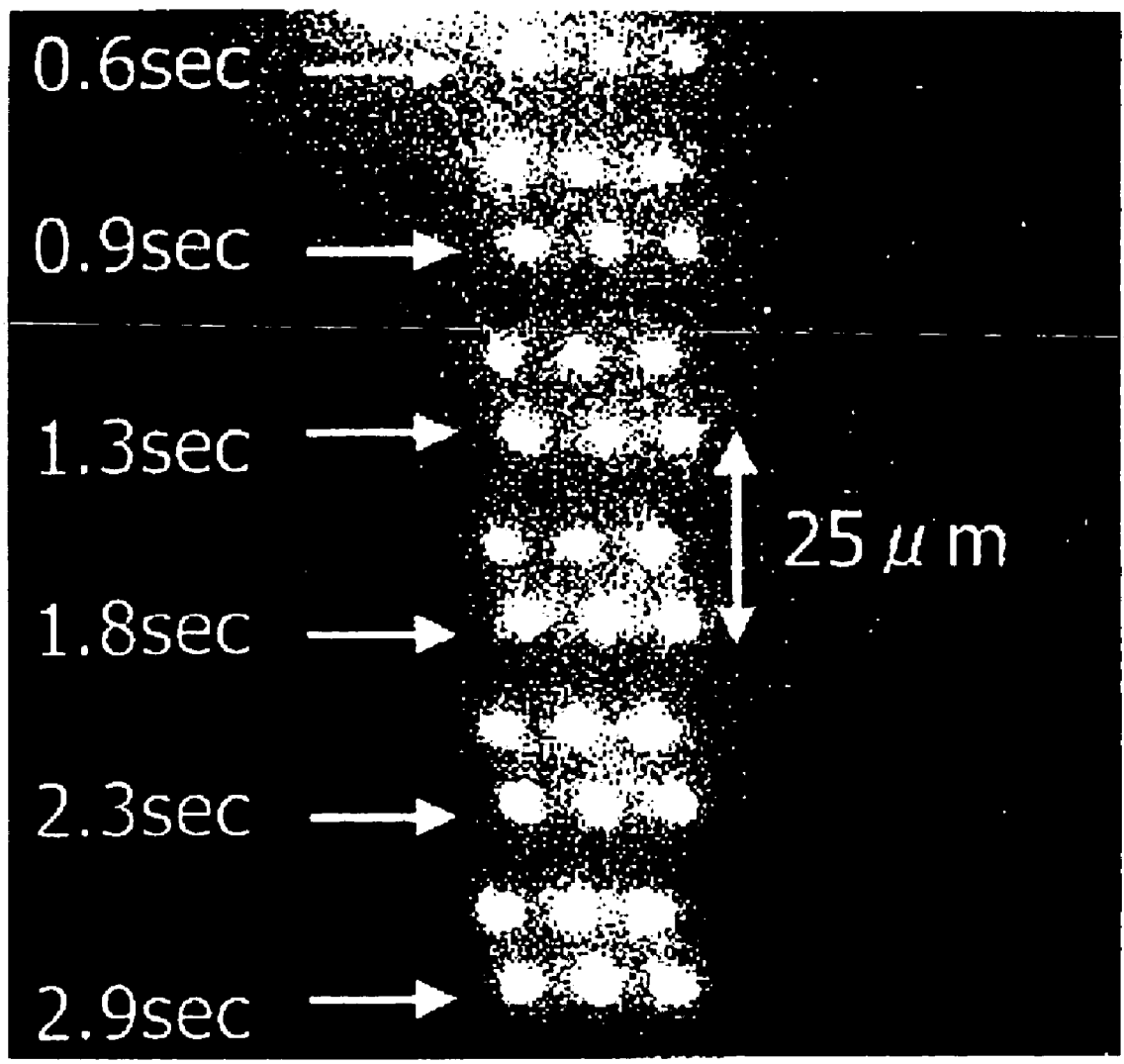
FIG. 10 shows irradiation time-dependent fluorescent dot patterns.

The test result is described below with reference to FIGS. 9 to 12. The condition for fluorescent dot pattern formation is shown in Table 4. FIG. 9 is under the condition A of Table 4; FIG. 10 is under the condition B in Table 4; and FIG. 12 is under the condition C in Table 4.

TABLE 4

Figure 12:
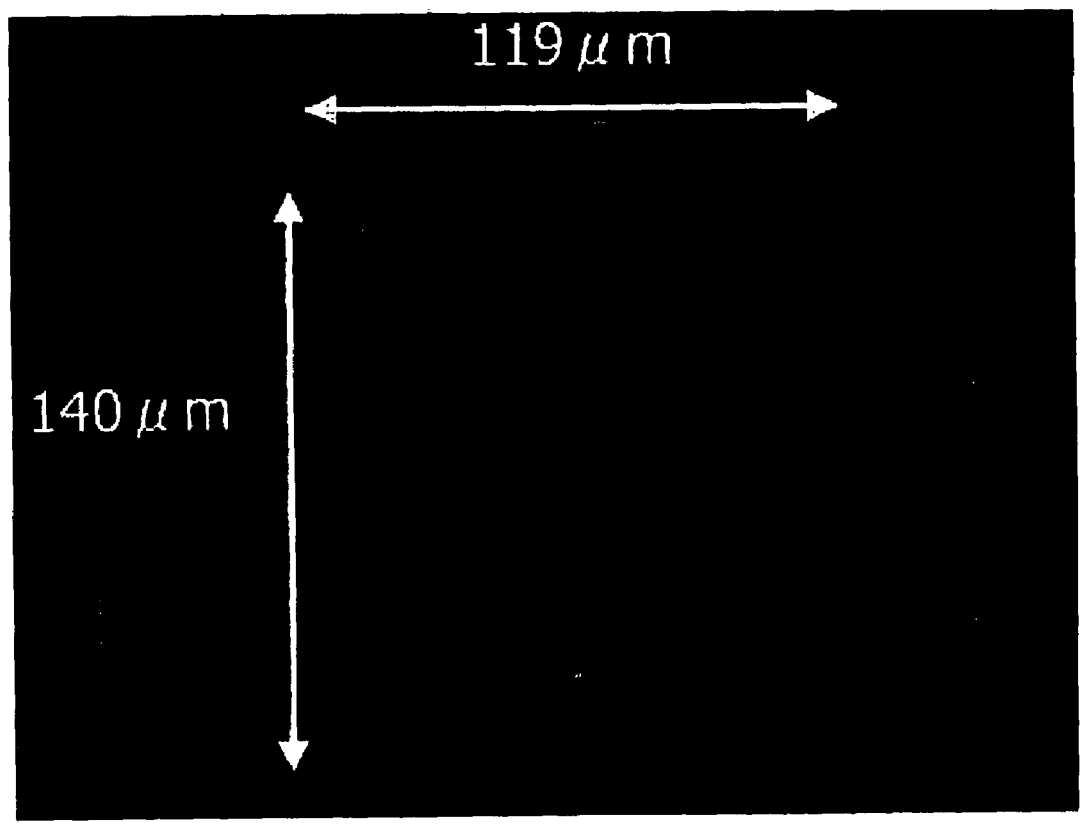
FIG. 12 shows a letter pattern written in the Example.

| | A | B | C |
|---|---|---|---|
| Laser Light Power (mW) | 1.2 | 1.2 | 1.2 |
| Objective Lens (power) | 20 | 50 | 50 |
| Objective Lens (NA) | 0.5 | 0.5 | 0.5 |
| Irradiation Time (sec) | 0.6 to 2.9 (from bottom to top) | 0.6 to 2.9 (from bottom to top) | 0.6 |
| Dot-to-Dot Distance (μm) | cross-direction: 200 machine-direction: 100 | cross-direction: 10 machine-direction: 10, 15 | 7 |
| Drawing | FIG. 9 | FIG. 10 | FIG. 12 |

Figure 11:
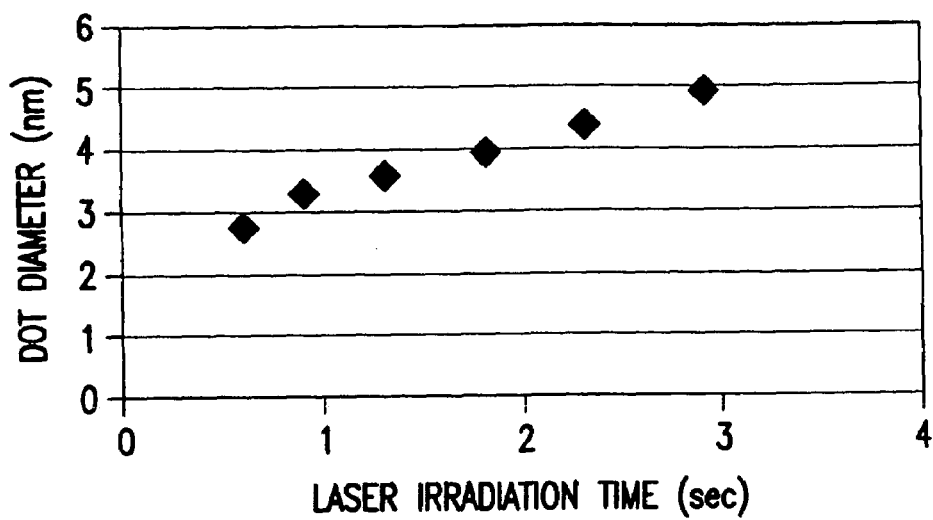
FIG. 11 shows a relationship between dot size and irradiation time.

FIG. 9 is a fluorescent dot pattern formed with 442-nm light. FIG. 10 is for confirming the irradiation time dependency of dot size. The result is that the minimum dot size is 2.7 μm (diameter) for an irradiation time of 0.6 sec/dot. Within the irradiation time range, the written data were more effectively read with no trouble of fluorescent dot contrast reduction. FIG. 11 is a graph in which the irradiation time per dot is on the horizontal axis and the dot diameter is on the vertical axis. These results confirm that, under the working condition in Table 3, the minimum dot size is 2.7 μm and the dot diameter increases with the increase in the irradiation time. The time taken for writing letters was 3 minutes. In this Example, the dot-to-dot distance was 7 μm, and the minimum dot diameter in irradiation for 0.6 seconds was 2.7 μm. The dot patterning is shown in FIG. 12.

EXAMPLE 5

Figure 13:
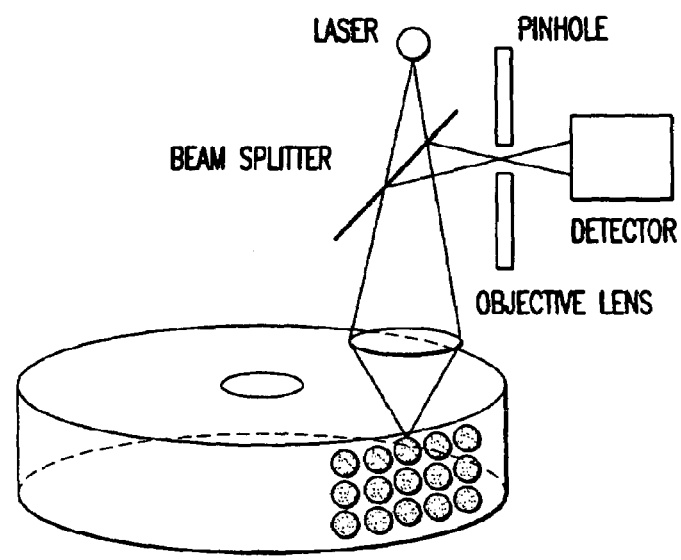
FIG. 13 shows a schematic view of the constitution of a confocal fluorescence microscope.

This is to demonstrate the formation of a three-dimensional dot pattern. The same optical system for fluorescent dot pattern formation as in Example 3 was used herein, except for some changes mentioned below. For forming dot patterns in any desired site in the three-dimensional space inside the sample, the two-dimensional dot patterning method was modified by adding the scanning operation in Z-stage thereto. For reading the formed dot patterns, used was 543.5-nm He—Ne laser combined with a confocal fluorescence microscope (FV500, by Olympus Optical Industry). FIG. 13 shows the constitution of the confocal fluorescence microscope.

The confocal microscope is characterized in that a pinhole is disposed before the detector thereof, and it is known that the microscope has a high three-dimensional resolving power. The excited light converged through an objective lens is three-dimensionally scanned. When the converged spot of the excited light has overlapped with the formed dots, then the dots emit fluorescence. The emitted fluorescence is again converged at the pinhole through the objective lens, and the passing fluorescence is detected by the detector. The fluorescence from the other sites than the position of the focal point of the objective lens does not pass through the pinhole and is cut. Accordingly, the fluorescence from the focal point position alone may be detected, and this is scanned on a plane and further in the Z-axis depth direction to obtain the fluorescence intensity distribution of three-dimensional resolution.

Figure 14A:
FIG. 14 shows images observed through a confocal fluorescence microscope.
Figure 14B:
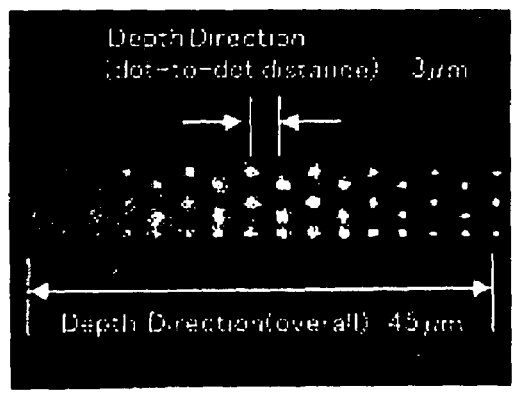
Figure 14C:
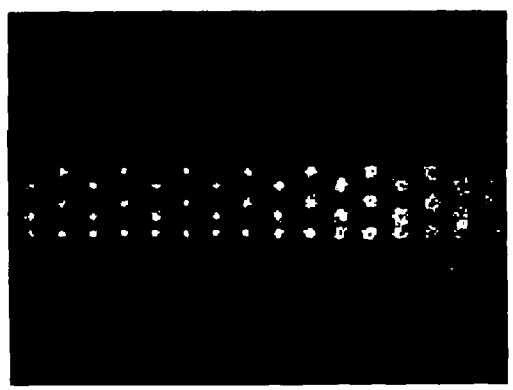
Figure 14D:
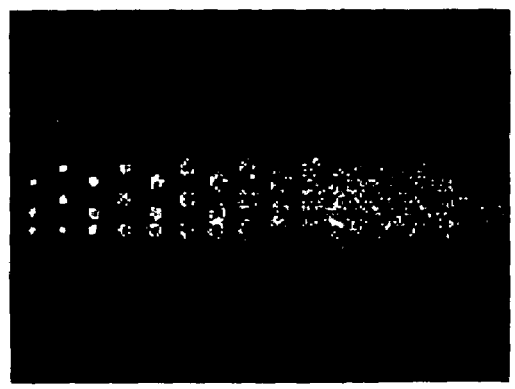
Figure 15:
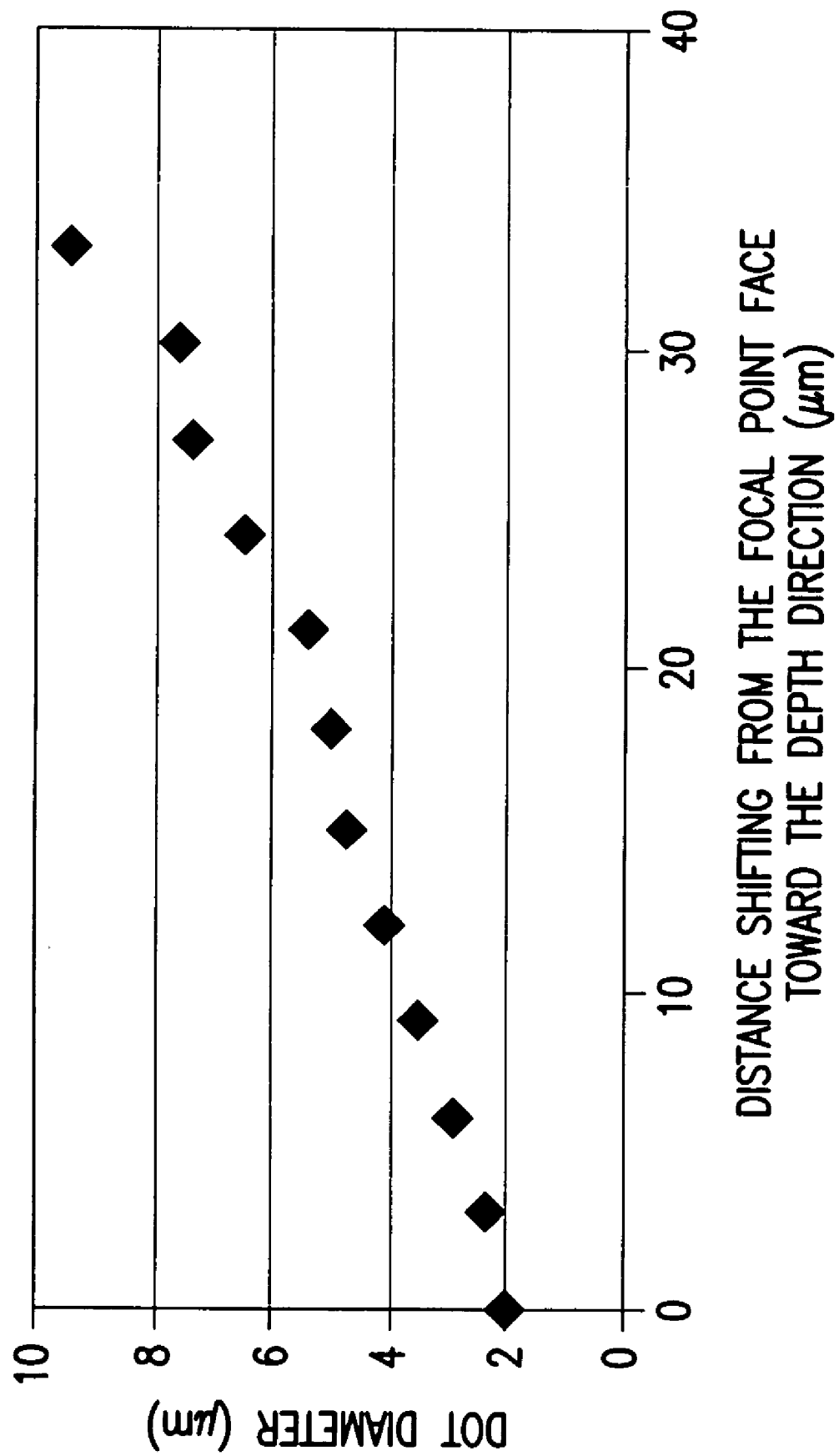
FIG. 15 shows the minimum diameter of one dot relative to the distance that shifts from the focal point face toward the depth direction.
Figure 16:
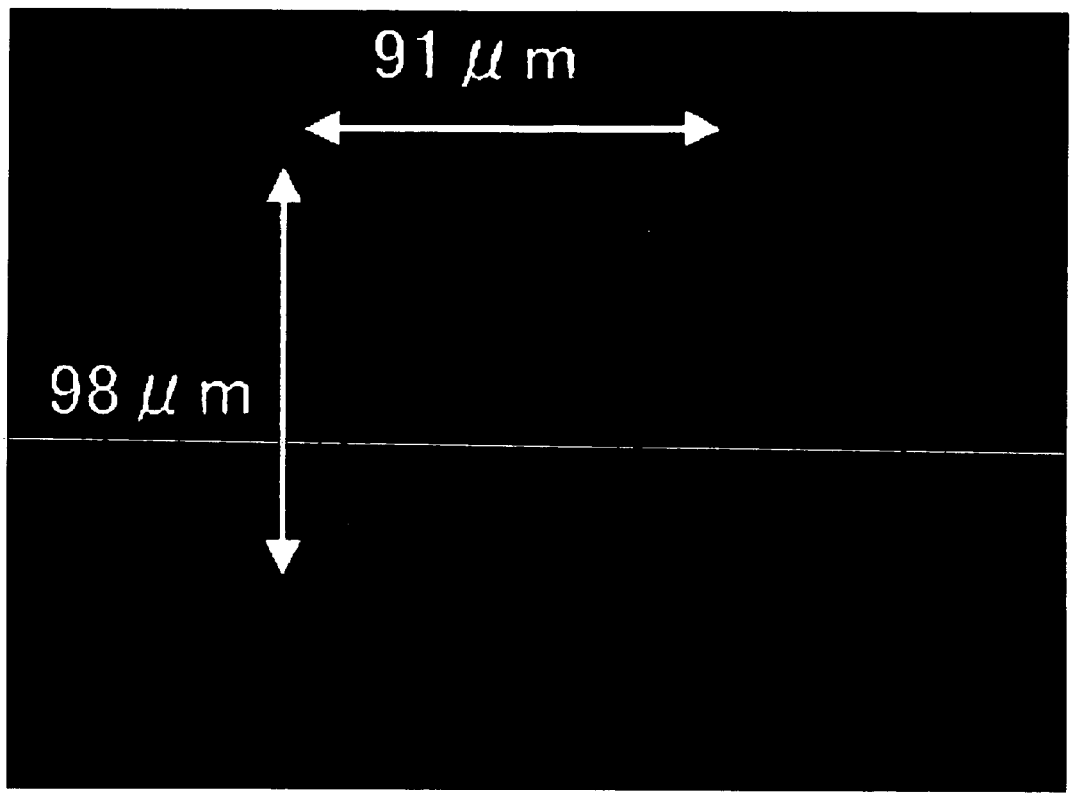
FIG. 16 shows three-dimensional dot patterns.
Figure 16:
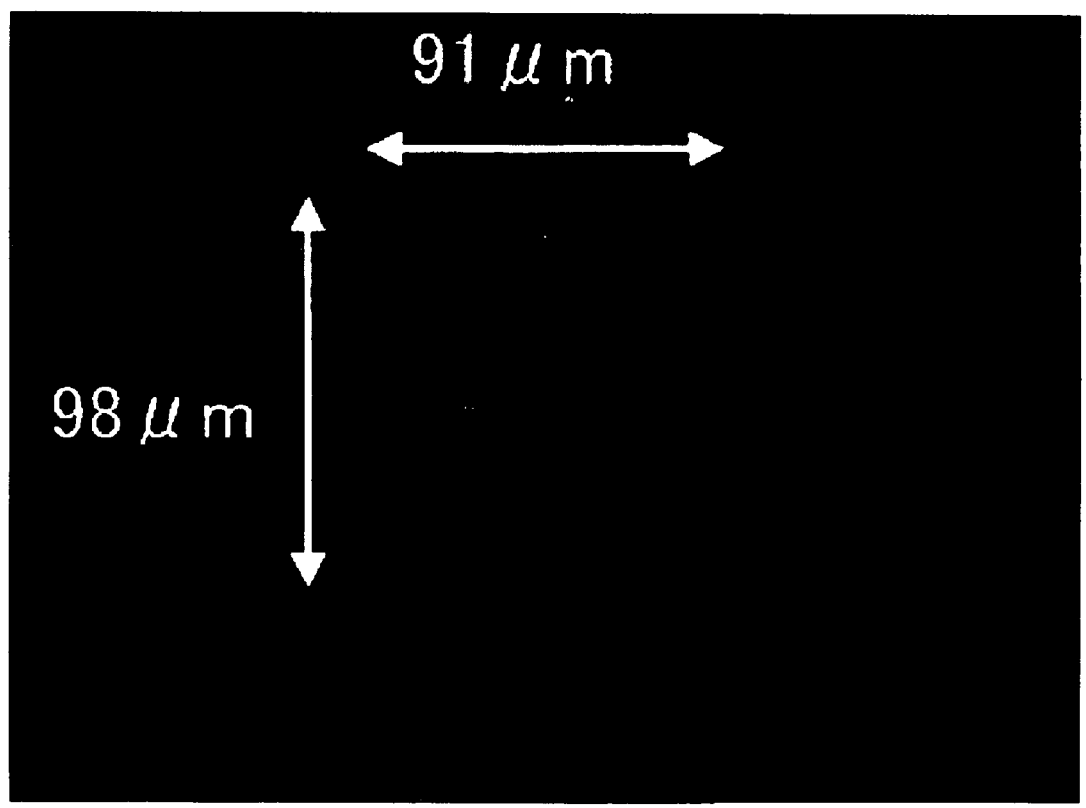
Figure 17:
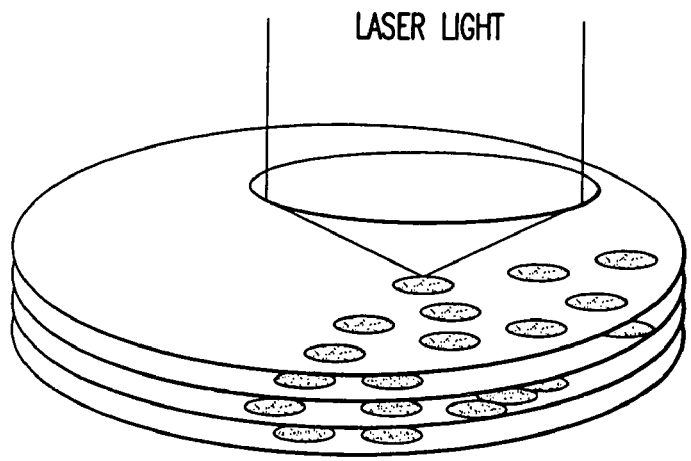
FIG. 17 shows a schematic view of a three-dimensional optical memory.
Figure 18A:
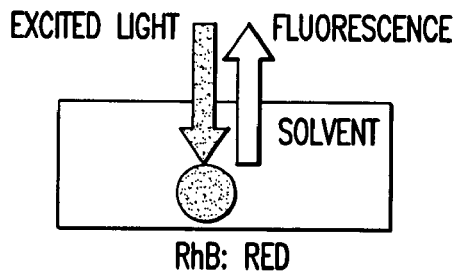
FIG. 18 shows schematic views of the mechanism of rhodamine B in PMMA.
Figure 18B:
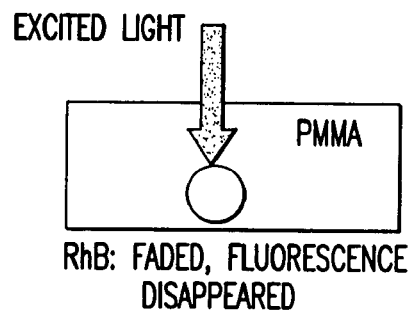
Figure 18C:
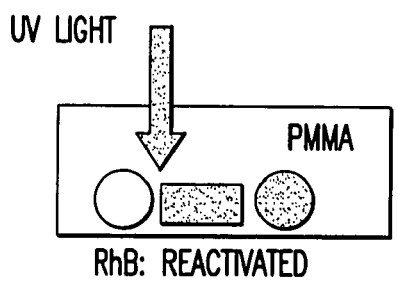
Figure 18D:
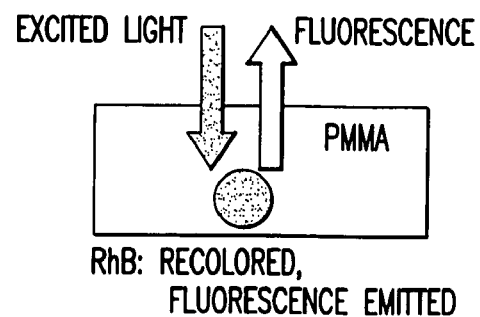

The result is described herein under with reference to FIG. 14 to FIG. 16. The sample tried herein is (1) in Table 3. The condition for forming the three-dimensional fluorescent dot pattern is shown in Table 5. FIGS. 14 and 15 are the data measured under the condition A in Table5; and FIG. 16 is under the condition B in Table 5.

TABLE 5

|  | A | B |
|---|---|---|
| Laser Power (mW) | 1.2 | 1.2 |
| Objective Lens (power) | 50 | 50 |
| Irradiation Time (sec) | 0.5 | 0.5 |
| Dot Distance: in-plane direction (μm) | 10 | 7 |
| Dot Distance: depth direction (μm) | 3 | 50 |
| Drawing | FIG. 15 | FIG. 16 |

FIG. 14 is for confirming the reality of three-dimensional dot pattern formation and reading. The distance between the dots that are adjacent to each other in the cross direction is 3 μm each, and the overall distance shifting in the depth direction is 45 μm (see FIG. 14). The images (a) to (d) of FIG. 14 are those observed with a confocal microscope at a distance of 0, 15, 30 and 45 μm, respectively, from the sample. Not only in the in-plane direction but also in the Z-direction, the stage was scanned and the dot pattern was formed also in the depth direction. The minimum diameter of one dot was 3 μm. It is understood that the dot size increases and the dots are more unclear with the increase in the distance that shifts from the focal point face of the confocal microscope toward the depth direction.

FIG. 15 is a graph drawn by plotting the data in FIG. 12(d), in which the horizontal axis indicates the distance of the dot pattern that shifts from the focal point face toward the depth direction and the vertical axis indicates the dot size. The graph confirms that the dot size increases with the increase in the distance of the writing face that shifts from the focal point face toward the depth direction. It further confirms that the shifting distance dependence of the dot size in the depth direction is almost linear.

FIG. 16 shows three-dimensional patterns formed by shifting by 50 μm in the depth direction alone, not changing the writing position in the in-plane direction. For these, the reading face was shifted by 42 μm by the use of a confocal microscope. In FIG. 14(a), seen is a letter "D" formed of 80 dots in total in a face of 91×98 μm$^2$; and in FIG. 14(b), seen is a letter "Y" formed of 54 dots in total in a face of 91×98 μm$^2$. In both (a) and (b), the pattern written in a layer that differs from the focal point position of the microscope was blurred and disappeared. This confirms that the patterns could be reproduced while three-dimensionally separated from each other.

The present invention has made it possible to produce films having a thickness applicable to optical memories. Further, the films can be used in optical memory materials, especially in three-dimensional memories.

In the invention, PMMA is used for the resin. The invention suggests that any other resin material such as UV resin, positive/negative photoresist, polycarbonate, polyamide, polystyrene and polyurethane may be used in future for producing optical memory materials according to the same mechanisms as in the invention.

The present disclosure relates to the subject matter contained in Japanese Patent Application No. 175819/2003 filed on Jun. 20, 2003, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a fluorescent material containing PMMA and a fluorescent substance, which comprises a step of dissolving in a solvent PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring to form a solution, wherein the amount of the PMMA is from 5 to 35 % by weight of the solvent, and a step of removing the solvent from the solution.

2. A method for producing a film containing PMMA and a fluorescent substance, which comprises a step of dissolving in a solvent PMMA and a fluorescent substance having a xanthene skeleton and a lactone ring and/or a fluorescent substance having a xanthene skeleton and a group —COOR, where R represents a hydrogen atom or a substituent, capable of forming an intramolecular lactone ring to form a solution, wherein the amount of the PMMA is from 5 to 35 % by weight of the solvent, and a step of removing the solvent from the solution.

3. The method for film production as claimed in claim 2, wherein the solvent is a non-polar solvent.

4. The method for film production as claimed in claim 2, wherein the solvent is a cellosolve acetate.

5. The method for film production as claimed in claim 2, which includes a step of forming the film in a mode of spin coating.

6. The method for film production as claimed in claim 2, which includes a step of forming the film having a thickness of at most 10 μm in a mode of spin coating.

7. The method for film production as claimed in claim 2, which includes a step of forming the film having a thickness of from 1 to 10 μm in a mode of spin coating.

8. The method for film production as claimed in claim 2, which includes a step of forming the film having a thickness of at most 1 μm in a mode of spin coating.

* * * * *